United States Patent
Panje et al.

(10) Patent No.: US 11,490,268 B2
(45) Date of Patent: Nov. 1, 2022

(54) MONITORING AND INSTALLATION ENHANCEMENTS FOR DEVICES IN A WIRELESS NETWORK

(71) Applicant: ARRIS Enterprises LLC, Suwanee, GA (US)

(72) Inventors: Krishna Prasad Panje, Bengaluru (IN); Lakshmi Arunkumar, Karnataka (IN)

(73) Assignee: ARRIS ENTERPRISES LLC, Suwanee, GA (US)

(*) Notice: Subject to any disclaimer, the term of this patent is extended or adjusted under 35 U.S.C. 154(b) by 102 days.

(21) Appl. No.: 17/217,009

(22) Filed: Mar. 30, 2021

(65) Prior Publication Data

US 2021/0345128 A1    Nov. 4, 2021

Related U.S. Application Data

(60) Provisional application No. 63/017,828, filed on Apr. 30, 2020.

(51) Int. Cl.

| | |
|---|---|
| *H04W 88/16* | (2009.01) |
| *H04W 16/18* | (2009.01) |
| *H04W 24/08* | (2009.01) |
| *H04W 84/18* | (2009.01) |

(52) U.S. Cl.
CPC .......... *H04W 16/18* (2013.01); *H04W 24/08* (2013.01); *H04W 88/16* (2013.01); *H04W 84/18* (2013.01)

(58) Field of Classification Search
CPC ..... H04W 16/18; H04W 24/08; H04W 88/16; H04W 84/18; H04W 16/26; H04W 84/12; H04W 24/04; H04L 41/0672; H04L 43/0817; H04L 43/10
See application file for complete search history.

(56) References Cited

U.S. PATENT DOCUMENTS

| | | | |
|---|---|---|---|
| 2016/0302096 A1* | 10/2016 | Chari | H04W 40/12 |
| 2017/0272977 A1* | 9/2017 | Rengarajan | H04W 40/16 |
| 2017/0366249 A1* | 12/2017 | Van Oost | H04W 52/0206 |

OTHER PUBLICATIONS

International Search Report and the Written Opinion of the International Searching Authority dated Jul. 21, 2021 in International (PCT) Application No. PCT/US2021/024817.

* cited by examiner

*Primary Examiner* — Said M Elnoubi
(74) *Attorney, Agent, or Firm* — Wenderoth, Lind & Ponack, L.L.P.

(57) ABSTRACT

An apparatus, system, method, and computer-readable recording medium monitor and detect connection issues in a wireless network. The wireless network communicatively interconnects a gateway device including a network controller, wireless extenders, and client devices. The gateway device receives probe requests from the client devices and the wireless extenders, and the network controller periodically monitors at least one of: i) frame parameters or ii) signal strength information based on the probe requests, and identifies a connection issue with respect to at least one of the wireless extenders. The gateway device transmits a report or alert regarding the connection issue to at least one client device, and the report or alert is used to prompt re-installation of the wireless extender having the connection issue.

21 Claims, 4 Drawing Sheets

MONITORING AND INSTALLATION ENHANCEMENTS FOR DEVICES IN A WIRELESS NETWORK

TECHNICAL FIELD

The subject matter of the present disclosure relates generally to monitoring and management of wireless devices in wireless networks.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for wireless routing protocols such as a multi-access point (MAP) or mesh protocol, which allows for wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP controller device. Typically, the MAP controller device obtains learned station (STA) information (e.g., band capability, steering friendly devices, etc.) from other wireless devices (e.g., APs, gateways, or extenders) in the wireless network. Additionally, wireless management functions can be provided for the MAP controller device for management of the MAP or mesh network to improve quality of experience (QoE) for users. In a typical MAP or mesh network, there can be multiple wireless extenders under the control and management of the MAP controller device.

For example, in a MAP or mesh network, a home user can install several wireless extenders at different places in the home to get a seamless coverage that is managed and controlled by the MAP controller device. Additionally, the wireless extenders installed in the MAP or mesh network do not necessarily need to be of the same make and model. However, over time, performance of the MAP or mesh network can degrade because of various issues related to the different wireless extenders.

The issues related to the different wireless extenders can include software issues, hardware issues, signal level variations due to obstructions, or other performance and installation issues. Currently, there is no effective way for conventional MAP controllers to monitor, identify, and address performance issues related to the wireless extenders in a MAP or mesh network. For example, it can be difficult for conventional MAP controllers to monitor, identify issues, and initiate corrective action with regard to a specific wireless extender in the MAP or mesh network.

Thus, it would be advantageous and an improvement over the relevant technology to provide an apparatus, system, method, and program for providing monitoring and installation enhancements in a wireless network having one or more wireless extenders, such that overall system performance and QoE in the wireless network is improved.

SUMMARY

An aspect of the present disclosure provides a gateway device for monitoring and detecting a connection issue in a wireless network. The wireless network is configured to communicatively interconnect the gateway device, one or more wireless extenders, and one or more client devices. The gateway device includes a network controller, a non-transitory memory storing a program, and a communication interface configured to establish communication connections with the one or more client devices and one or more wireless extenders via the wireless network.

The network controller is configured to execute the program to: receive, using the communication interface, probe requests from the one or more client devices and the one or more wireless extenders; and periodically monitor, using the network controller, at least one of: i) frame parameters, or ii) signal strength information based on the probe requests received from the one or more client devices and the one or more wireless extenders.

The network controller identifies a connection issue with respect to at least one wireless extender among the one or more wireless extenders based on the periodically monitored at least one of: i) frame parameters, or ii) signal strength information; and transmits, using the communication interface, a report or alert regarding the connection issue to at least one client device among the one or more client devices. The report or alert is used to prompt a re-installation of the at least one of the wireless extenders having the connection issue. The network controller can be a multi-access point controller or a mesh network controller.

In an aspect of the present disclosure, the network controller periodically monitors non-associated station reports with respect to the one or more client devices, and the report or alert indicates that the at least one wireless extender having the connection issue includes a reduced number or no non-associated station reports with respect to the one or more client devices.

In an aspect of the present disclosure, the network controller periodically monitors non-associated received signal strength indicator (RSSI) information, and the report or alert indicates that the at least one wireless extender having the connection issue includes a low non-associated RSSI compared to historical averages of non-associated RSSI.

In an aspect of the present disclosure, the gateway device periodically monitors a preferred access point (AP) list of the one or more client devices, and the report or alert indicates that the at least one wireless extender having the connection issue is not included on the preferred AP list.

In an aspect of the present disclosure, the gateway device periodically monitors multi-access point (MAP) steering logic, and the report or alert indicates that the at least one wireless extender having the connection issue is not a preferred target device of the MAP steering logic.

In an aspect of the present disclosure, the gateway device periodically monitors client device dwell times, and the report or alert indicates decreased dwell times by the one or more client device on the at least one wireless extender having the connection issue during a predetermined timed period.

In an aspect of the present disclosure, the gateway device periodically monitors association information indicating when any wireless extender is utilized as a backhaul device for another wireless extender or a number of client devices associated with each wireless extender, and the report or alert indicates that the at least one wireless extender having the connection issue utilizes another wireless extender as a backhaul device or includes a reduced number of associated client device while another wireless extender includes an increased number of associated client devices.

An aspect of the present disclosure provides a system for monitoring and detecting a connection issue in a wireless network. The wireless network is configured to communicatively interconnect a gateway device, one or more wireless extenders, and one or more client devices. The gateway device includes a hardware processor, a non-transitory memory storing a program, and a network interface configured to establish communication connections via the wireless network. Each client device includes a hardware processor, a non-transitory memory storing a program, and a network interface configured to establish communication connections via the wireless network. Additionally, each wireless extender includes a hardware processor, a non-transitory memory storing a program, and a network interface configured to establish communication connections via the wireless network.

Each of the gateway device, the one or more client devices, and the one or more wireless extenders execute their respective programs using their respective hardware processors to: receive, using each communication interface of one or more wireless extenders, probe requests from the one or more client devices; receive, using the communication interface of the gateway device, probe requests from the one or more client devices and the one or more wireless extenders; and periodically monitor, using the network controller of the gateway device, at least one of: i) frame parameters, or ii) signal strength information based on the probe requests received from the one or more client devices and the one or more wireless extenders.

The network controller identifies a connection issue with respect to at least one wireless extender among the one or more wireless extenders based on the periodically monitored at least one of: i) frame parameters, or ii) signal strength information; and transmits, using the communication interface the gateway device, a report or alert regarding the connection issue to at least one client device among the one or more client devices. The report or alert is used to prompt a re-installation of the at least one of the wireless extenders having the connection issue.

An aspect of the present disclosure provides a method for monitoring and detecting a connection issue in a wireless network. The wireless network is configured to communicatively interconnect a gateway device, one or more wireless extenders, and one or more client devices. The method includes receiving, at the one or more wireless extenders, probe requests from the one or more client devices; receiving, at the gateway device, probe requests from the one or more client devices and the one or more wireless extenders; and periodically monitoring, using the network controller, at least one of: i) frame parameters, or ii) signal strength information based on the probe requests received from the one or more client devices and the one or more wireless extenders.

The method further includes identifying, using the network controller, a connection issue with respect to at least one wireless extender among the one or more wireless extenders based on the periodically monitored at least one of: i) frame parameters, or ii) signal strength information; and transmitting, from the gateway device, a report or alert regarding the connection issue to at least one client device among the one or more client devices. The report or alert is used for prompting a re-installation of the at least one of the wireless extenders having the connection issue.

In an aspect of the present disclosure the periodically monitoring of at least one of: i) frame parameters, or ii) signal strength information includes monitoring of non-associated station reports with respect to the one or more client devices, and the transmitted report or alert indicates that the at least one wireless extender having the connection issue includes a reduced number or no non-associated station reports with respect to the one or more client devices In an aspect of the present disclosure, the periodically monitoring of at least one of: i) frame parameters, or ii) signal strength information includes monitoring non-associated received signal strength indicator (RSSI) information, and the transmitted report or alert indicates that the at least one wireless extender having the connection issue includes a low non-associated RSSI compared to historical averages of non-associated RSSI.

In an aspect of the present disclosure, the periodically monitoring of at least one of: i) frame parameters, or ii) signal strength information includes monitoring a preferred access point (AP) list of the one or more client devices, and the transmitted report or alert indicates that the at least one wireless extender having the connection issue is not included on the preferred AP list.

In an aspect of the present disclosure, the periodically monitoring of at least one of: i) frame parameters, or ii) signal strength information includes monitoring multi-access point (MAP) steering logic, and the transmitted report or alert indicates that the at least one wireless extender having the connection issue is not a preferred target device of the MAP steering logic.

In an aspect of the present disclosure, the periodically monitoring of at least one of: i) frame parameters, or ii) signal strength information includes monitoring of client device dwell times, and the transmitted report or alert indicates decreased dwell times by the one or more client device on the at least one wireless extender having the connection issue during a predetermined timed period.

In an aspect of the present disclosure, the periodically monitoring of at least one of: i) frame parameters, or ii) signal strength information includes monitoring association information indicating when any wireless extender is utilized as a backhaul device for another wireless extender or a number of client devices associated with each wireless extender, and the transmitted report or alert indicates that the at least one wireless extender having the connection issue utilizes another wireless extender as a backhaul device or includes a reduced number of associated client devices while another wireless extender includes an increased number of associated client devices.

An aspect of the present disclosure provides a non-transitory computer-readable recording medium in a gateway device. The non-transitory computer-readable recording medium stores one or more programs which when executed by the hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
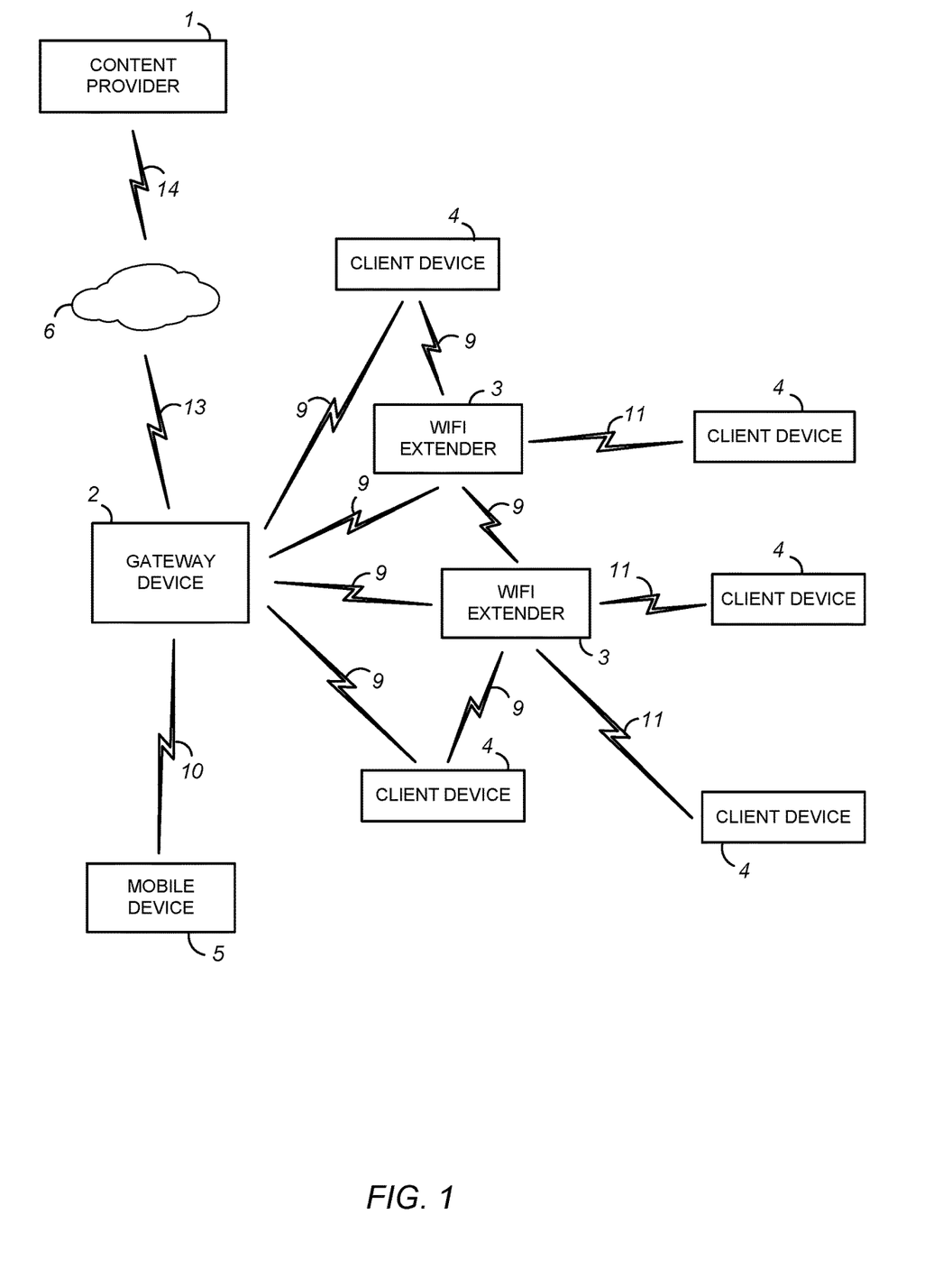
FIG. 1 is a schematic diagram of a system according to an embodiment of the present disclosure.

FIG. 1 is a schematic diagram of a system for monitoring and installation enhancements according to an embodiment of the present disclosure.

As shown in FIG. 1, the main elements of the system includes a gateway device 2 connected to a content provider 1 via the Internet 6 and also connected to different wireless devices such as wireless extenders 3 and client devices 4. Additionally, the gateway device 2 is connected wirelessly to a mobile device 5. The system shown in FIG. 1 includes wireless devices (e.g., extenders 3, client devices 4, and mobile device 5) that may be connected in one or more wireless networks (e.g., private, guest, iControl, backhaul network, or Internet of things (IoT) network) within the system. Additionally, there could be some overlap between wireless devices (e.g., extenders 3, client devices 4, and mobile device 5) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the content provider 1 can be, for example, a cable television provider, a satellite television provider, an internet service provider, or a multiple system operator (MSO). The connection 14 between the Internet 6 and the content provider 1 can be implemented using a wide area network (WAN), a virtual private network (VPN), metropolitan area networks (MANs), system area networks (SANs), a DOCSIS network, a fiber optics network (such as FTTH (fiber to the home), FTTX (fiber to the x), or HFC (hybrid fiber-coaxial)), a public switched data network (PSDN), a global Telex network, or a 2G, 3G, 4G or 5G network, for example. The connection 13 between the gateway device 2 and the Internet 6 can be implemented using a digital subscriber line (DSL), a coaxial cable connection, a broadband mobile phone network connection, an optical network connection, or other similar connections. The connection 13 can also be implemented using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is also contemplated by the present disclosure that connection 13 is capable of providing connections between the gateway device 2 and a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example.

The gateway device 2 can be, for example, a hardware electronic device that may be a combination modem and gateway device that combines the functions of a modem and a router for providing content received from the content provider 1 to network devices (e.g., wireless extenders 3, client devices 4, and mobile device 5) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connection 9 between the gateway device 2, the wireless extenders 3, and client devices 4 can be implemented using a wireless connection in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example.

Additionally, the connection 9 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connection 9 can include connections to a media over coax (MoCA) network.

The wireless extenders 3 can be, for example, hardware electronic devices that are used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, mobile device 5, or other client devices 4.

The connection 11 between the wireless extenders 3 and the client devices 4 are implemented through a wireless connection that operates in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the connection 11 can be implemented using a wireless connection that operates in accordance with, but is not limited to, IEEE 802.11 protocol, RF4CE protocol, ZigBee protocol, Z-Wave protocol, or IEEE 802.15.4 protocol.

The client devices 4 can be, for example, hand-held computing devices, personal computers, electronic tablets, smart phones, smart speakers, IoT devices, an iControl devices, or other similar wireless hand-held consumer electronic devices capable of executing and displaying the content received through, for example, the gateway device 2.

The connection 10 between the gateway device 2 and the mobile device 5 is implemented through a wireless connection that operates in accordance with, but is not limited to, IEEE 802.11 protocol. Additionally, the connection 10 between the gateway device 2 and the mobile device 5 can also be implemented through a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example. The connection 10 can also be implemented using a wireless connection in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example.

The mobile device 5 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnecting with other devices via Wi-Fi and Bluetooth protocols.

Figure 2:
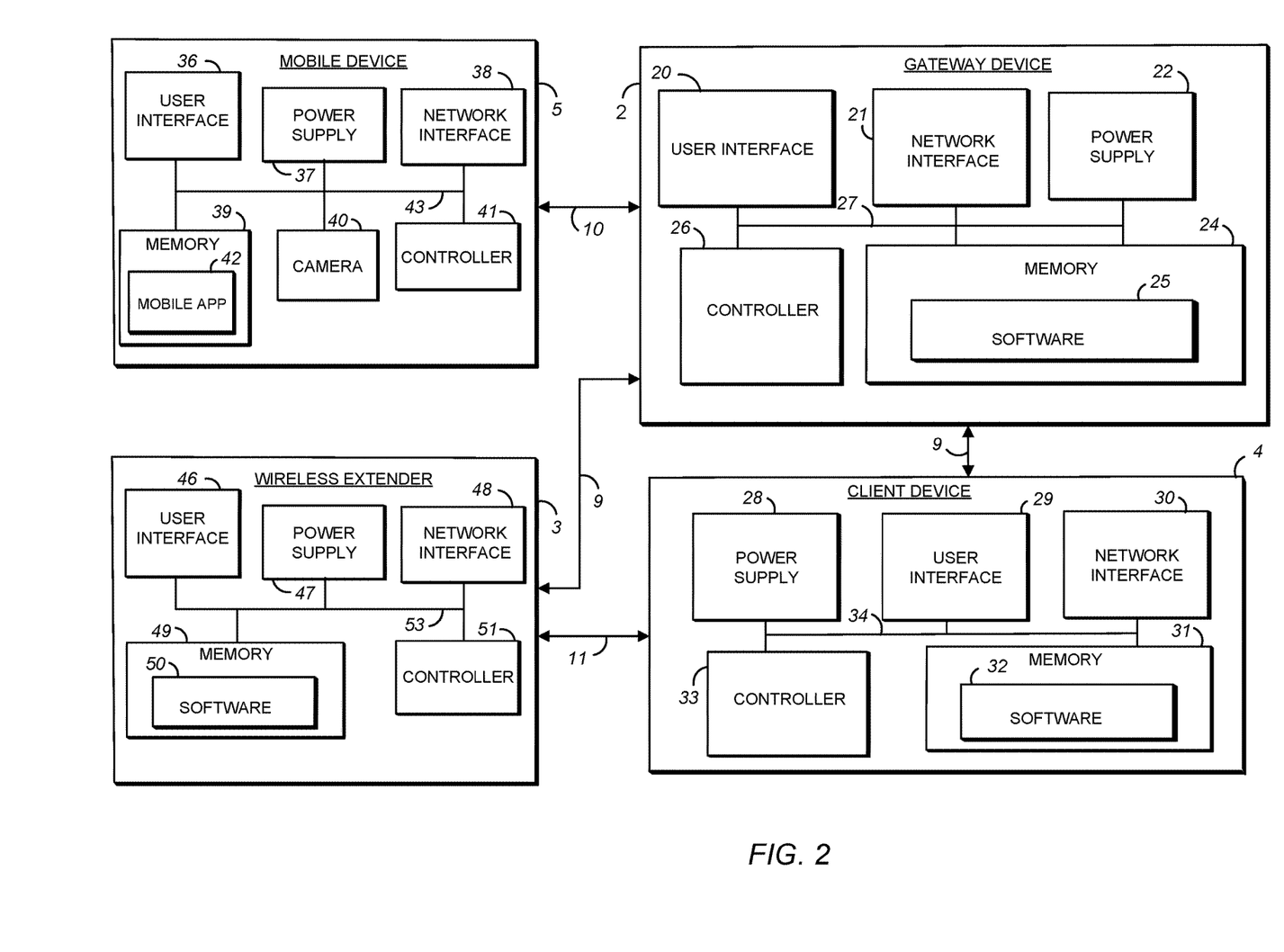
FIG. 2 is a more detailed schematic diagram of an exemplary gateway device, client device, wireless extender, and mobile device implemented in the system of FIG. 1 according to an embodiment of the present disclosure.

A detailed description of the exemplary internal components of the gateway device 2, wireless extenders 3, client devices 4, and mobile device 5 shown in FIG. 1 will be provided in the discussion of FIG. 2. However, in general, it is contemplated by the present disclosure that the gateway device 2, wireless extenders 3, client devices 4, and mobile device 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the gateway device 2, wireless extenders 3, client devices 4, and mobile device 5 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, wireless extenders 3, client devices 4, and mobile device 5 are further equipped with components to facilitate communication with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3, an exemplary client device 4, and an exemplary mobile device 5 implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9, 10, 11 between the gateway devices 2, wireless extenders 3, client devices 4, and mobile devices 5 shown in FIG. 2 are meant to be exemplary connections and are not meant to indicate all possible connections between the gateway devices 2, wireless extenders 3, client devices 4, and mobile devices 5 in FIG. 1. Additionally, it is contemplated by the present disclosure that the number of gateway devices 2, wireless extenders 3, client devices 4, and mobile devices 5 is not limited to the number of gateway devices 2, wireless extenders 3, client devices 4, and mobile devices 5 shown in FIGS. 1 and 2.

Now referring to FIG. 2 (e.g., from left to right), the mobile device 5 can be, for example, any handheld computer, smartphone, electronic tablet, e-reader, personal digital assistant (PDA), or portable music player with smart capabilities that is capable of connecting to the Internet, cellular networks, and interconnecting with other devices via Wi-Fi and Bluetooth. As shown in FIG. 2, the mobile device 5 includes a user interface 36, a power supply 37, a network interface 38, a memory 39, a camera 40, and a controller 41. The user interface 36 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the mobile device 5.

The power supply 37 provides power to the internal components of the mobile device 5 through the internal bus 43. The power supply 37 includes a self-contained power source such as a battery pack with an interface to be powered through an electrical charger connected to an outlet (e.g., either directly or by way of another device). The power supply 37 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The network interface 38 may include various network cards, interfaces, and circuitry implemented in software and/or hardware to enable communications with the gateway device 2 using connection 10. The various network cards, interfaces, and circuitry of network interface 38 enable communications via connection 10 using a wireless connection that operates in accordance with, but is not limited to, IEEE 802.11 protocol. The various network cards, interfaces, and circuitry of network interface 38 also enable communications via connection 10 using a wireless connection that operates in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of network interface 38 enable communications via connection 10 using a wireless connection that operates through the Internet, a computer network, a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example.

The memory 39 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 39 can be used to store any type of instructions including a mobile application 42 associated with algorithms, processes, or operations for controlling the general functions and operations of the mobile device 5 in accordance with the embodiments described in the present disclosure (e.g., including installation enhancements according to the embodiments of the present disclosure). The camera 40 can be a standard camera of a camera phone that is able to capture photographs and record video.

The controller 41 controls the general operations of the mobile device 5 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the mobile device 5. General communication between the components (e.g., 36-41) of the mobile device 5 is performed using the internal bus 43.

The wireless extender 3 can be, for example, a hardware electronic device that is used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 46, a power supply 47, a network interface 48, a memory 49, and a controller 51. The user interface 46 includes, but is not limited to, push buttons, a keyboard, a keypad, an LCD, a CRT, a TFT, an LED, an HD or other similar display device including a display device having touch screen capabilities so as to allow interaction between a user and the wireless extender 3. The power supply 47 supplies power to the internal components of the wireless extender 3 through the internal bus 53. The power supply 47 includes a self-contained power source such as a battery pack with an interface to be powered through an electrical charger connected to an outlet (e.g., either directly or by way of another device). The power supply 47 can also include a rechargeable battery that can be detached allowing for replacement such as a NiCd, a NiMH, a Li-ion, or a Li-pol battery.

The network interface 48 may include various network cards, interfaces, and circuitry implemented in software and/or hardware to enable communications with the client device 4 using connection 11 and with the gateway device 9 using connection 9. The various network cards, interfaces, and circuitry of the network interface 48 enable communications via connection 11 using a wireless protocol in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of the network interface 48 enable communications via connection 11 using a wireless connection in accordance with, but is not limited to, IEEE 802.11 protocol, RF4CE protocol, ZigBee protocol, Z-Wave protocol, or IEEE 802.15.4 protocol.

The various network cards, interfaces, and circuitry of the network interface 48 enable communications via connection 9 using a wireless protocol in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of the network interface 48 enable communications via connection 9 using a wireless connection that operates in accordance with, but is not limited to, IEEE 802.11 protocol, RF4CE protocol, ZigBee protocol, Z-Wave protocol, or IEEE 802.15.4 protocol.

The memory 49 includes a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 associated for controlling the general functions and operations of the wireless extender 3 in accordance with the embodiments described in the present disclosure (e.g., including monitoring and installation enhancements according to the embodiments of the present disclosure).

The controller 51 controls the general operations of the wireless extender 3 and includes, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender 3. General communication between the components (e.g., 46-49 and 51) of the wireless extender 3 is performed using the internal bus 53.

The gateway device 2 can be, for example, a hardware electronic device that can combine the functions of a modem and a router for providing content received from the content provider 1 to network devices (e.g., wireless extenders 3, client devices 4, and mobile device 5) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

As shown in FIG. 2, the gateway device 2 includes a user interface 20, a network interface 21, a power supply 22, a memory 24, and a controller 26. The user interface 20 includes, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3 and client device 4 using connection 9 and with the mobile device 5 using connection 10.

The various network cards, interfaces, and circuitry of the network interface 21 enable communications via connection 9 using a wireless protocol that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of network interface 21 enable communications via connection 9 using a wireless protocol that operates in accordance with, but is not limited to, IEEE 802.11 protocol, RF4CE protocol, ZigBee protocol, Z-Wave protocol, or IEEE 802.15.4 protocol.

The various network cards, interfaces, and circuitry of the network interface 21 enable communications via connection 10 using a wireless protocol that operates in accordance with, but is not limited to, IEEE 802.11 protocol. The various network cards, interfaces, and circuitry of the network interface 21 also enable communications via connection 10 using a wireless connection that operates through the Internet, a computer network, a WAN, a LAN, a VPN, MANs, PANs, WLANs, SANs, a DOCSIS network, a fiber optics network (such as FTTH, FTTX, or HFC), a PSDN, a global Telex network, or a 2G 3G, 4G or 5G network, for example, The power supply 22 supplies power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 in accordance with the embodiments described in the present disclosure (e.g., including monitoring and installation enhancements according to the embodiments of the present disclosure).

The controller 26 controls the general operations of the gateway device 2 and includes, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the gateway device 2. Communication between the components (e.g., 20-22, 24, and 26) of the gateway device 2 is established using the internal bus 27.

The client device 4 can be, for example, a computer, a portable device, an electronic tablet, a smart phone, a smart speaker, IoT device, iControl device, or other wireless hand-held consumer electronic device capable to executing and displaying the content received through the gateway device 2. As shown in FIG. 2, the client device 4 includes a power supply 28, user interface 29, network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device).

The power supply 28 can also include a rechargeable battery that can be detached allowing for replacement such as a NiCd, a NiMH, a Li-ion, or a Li-pol battery. The user interface 29 includes, but is not limited to, push buttons, a keyboard, a keypad, an LCD, a CRT, a TFT, an LED, an HD or other similar display device including a display device having touch screen capabilities so as to allow interaction between a user and the client device 4.

The network interface 30 may include various network cards, interfaces, and circuitry implemented in software and/or hardware to enable communications with the gateway device 2 via connection 9 and with the wireless extender 3 via connection 11. The various network cards, interfaces, and circuitry of the network interface 30 enable communications via connection 9 using a wireless protocol that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of network interface 30 enable communications via connection 9 using a wireless protocol that operates in accordance with, but is not limited to, IEEE 802.11 protocol, RF4CE protocol, ZigBee protocol, Z-Wave protocol, or IEEE 802.15.4 protocol.

The various network cards, interfaces, and circuitry of the network interface 30 enable communications via connection 11 using a wireless protocol that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using radio waves in the 2.4 GHz bands, the 5 GHz bands, or the 6 GHz bands, for example. Additionally, the various network cards, interfaces, and circuitry of the network interface 30 enable communications via connection 11 using a wireless connection that operates in accordance with, but is not limited to, IEEE 802.11 protocol, RF4CE protocol, ZigBee protocol, Z-Wave protocol, or IEEE 802.15.4 protocol.

The memory 31 includes a single memory or one or more memories or memory locations that include, but are not limited to a RAM, a DRAM, a memory buffer, a hard drive, a database, an EPROM, an EEPROM, a ROM, a flash memory, logic blocks of a FPGA, hard disk or any other various layers of memory hierarchy. The memory 31 can be used to store any type of instructions, software, or algorithms for controlling the general function and operations of the client device 4 in accordance with the embodiments described in the present disclosure (e.g., including monitoring and installation enhancements according to the embodiments of the present disclosure).

The controller 33 controls the general operations of the client device 4 and includes, but is not limited to, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the client device 4. Communication between the components (e.g., 28-31 and 33) of the client device 4 is established using an internal bus 34.

Figure 3:
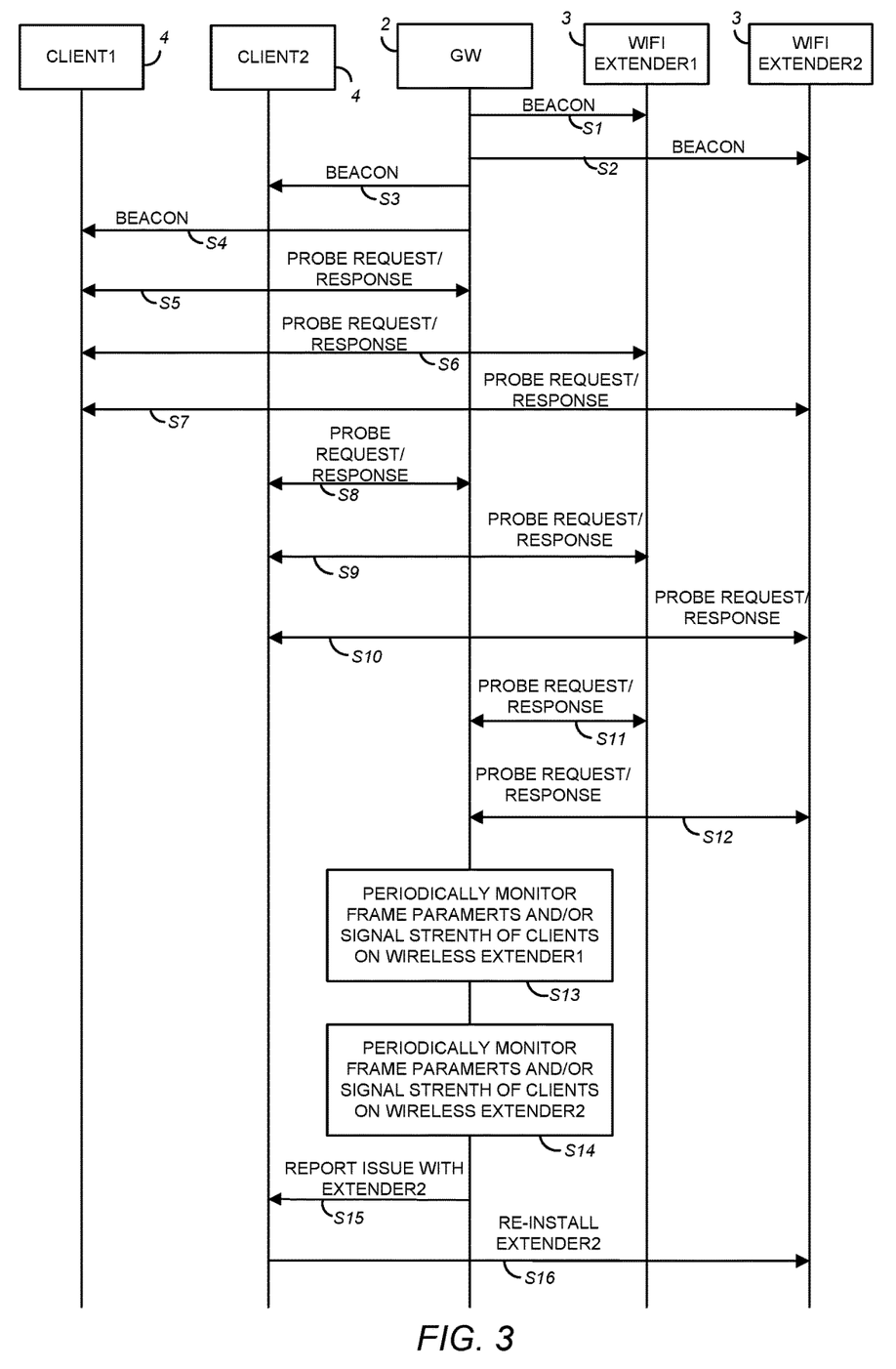
FIG. 3 illustrates a method and algorithm for performing monitoring and installation enhancements according to an embodiment of the present disclosure.

FIG. 3 illustrates a method and algorithm for performing monitoring and installation enhancements according to an embodiment of the present disclosure. In FIG. 3, it is assumed that client1 (e.g., client device 4), client2 (e.g., client device 4), Wi-Fi extender1 (e.g., wireless extender 3), Wi-Fi extender2(e.g., wireless extender 3), and the gateway device 2 include their respective software 25, 32, 50 stored in their respective memories 24, 31, 49, which when executed by their respective controllers 26, 33, 51 perform the functions and operations in accordance with the embodiments described in the present disclosure (e.g., including monitoring and installation enhancements according to the embodiments of the present disclosure).

Although FIG. 3 shows one gateway device 2, two client devices 4 (e.g., client1 and client2) and two wireless extenders 3 (e.g., Wi-Fi extender1 and Wi-Fi extender2), it is contemplated by the present disclosure that the method and algorithm can be applied to any number of gateway devices 2, client devices 4, and wireless extenders 3 for providing monitoring and installation enhancements in any number of wireless networks in the system of FIG. 1.

In steps S1-S4, the gateway device 2 transmits beacon signals to Wi-Fi extender1 (e.g., wireless extender 3), Wi-Fi extender2 (e.g., wireless extender 3), client1 (e.g., client device 4) and client2 (e.g., client device 4) using the network interface 21 and the respective wireless connections 9.

The beacon signals are initially used to announce the existence of the one or more networks, but can be transmitted at regular or periodic intervals as part of a network monitoring and management function for the one or more networks in the system. As mentioned, the beacon signals can be transmitted at regular or periodic intervals and allow client1 (e.g., client device 4), client2 (e.g., client device 4), Wi-Fi extender1 (e.g., wireless extender 3), and Wi-Fi extender2 (e.g., wireless extender 3) to find and identify the one or more networks and for the exchange of device and network parameters between the devices.

It is contemplated by the present disclosure that the beacon signals include beacon frames with parameters such as, but not limited to, timestamps, beacon intervals, capability information, service set identifiers (SSIDs), supported data rates, frequency-hopping (FH) parameter sets, direct-sequence (DS) parameter sets, contention-free (CF) parameter sets, independent basic service set identifiers (IBSSs), traffic indication maps (TIMs) and other similar parameters related to devices and networks in the system. The client1 (e.g., client device 4) and client2 (e.g., client device 4), Wi-Fi extender1 (e.g., wireless extender 3), and Wi-Fi extender2 (e.g., wireless extender 3) generally scan all channels in the system searching for beacons announcing the presence of a nearby access point such as the gateway device 2, available networks, and parameters related to other devices and the networks.

In step S5, client1 (e.g., client device 4) and the gateway device 2 exchange probe signals. That is, client1 (e.g., client device 4) receives the beacon signal (in step S4) using its network interface 30 and wireless connection 9 and obtains the beacon frame parameters regarding the capabilities and configuration of the one or more networks. In step S5, the client1 (e.g., client device 4) then transmits a probe request using again its network interface 30 and wireless connection 9 back to the gateway device 2. The gateway device 2 receives the probe request via its network interface 21 and wireless connection 9 and responds by transmitting a probe response back to the client1 (e.g., client device 4) using again its network interface 21 and wireless connection 9.

It is contemplated by the present disclosure that the probe request includes a probe request frame with parameters such as, but not limited to, SSIDs and the rates supported by client1, BSSID, capability information, power level information, association reports, non-association reports, channel usage, dwell times, reason codes, and other similar device and network parameters.

The probe response from the gateway device 2 includes a probe response frame with parameters that are similar to the parameters in the beacon frame and include, but not limited to, timestamps, beacon intervals, capability information, SSIDs, supported data rates, FH parameter sets, DS parameter sets, CF parameter sets, IBSS, TIM, and other similar device and network parameters. The probe response frame carries all the parameters in a beacon frame, which enables the client1 (e.g., client device 4) to obtain device and network parameters, match parameters, and join one or more networks in the system. The client1 (e.g., client device 4) must support all the data rates required by a network and must want to join a network identified by an SSID, which may be set to a specific network or set to join any compatible network.

It is contemplated by the present disclosure that the exchange of probe signals between the gateway 2 and the client1 (e.g., client device 4) in step S5 can be performed at regular or periodic intervals as part of a network monitoring and management function for the one or more networks in the system of FIG. 1.

In steps S6 and S7, client1 (e.g., client device 4) also sends probe requests to Wi-Fi extender1 (e.g., wireless extender 3) and Wi-Fi extender2 (e.g., wireless extender 3) using network interface 30 and connection 9. Each of Wi-Fi extender1 (e.g., wireless extender 3) and Wi-Fi extender2 (e.g., wireless extender 3) receives the probe request using its network interface 48 and wireless connection 9 and obtains the probe request frame parameters. Each of Wi-Fi extender1 (e.g., wireless extender 3) and Wi-Fi extender2 (e.g., wireless extender 3) transmits a probe response back to the client1.

It is contemplated by the present disclosure that the probe request from the client1 (e.g., client device 4) and the probe response from the Wi-Fi extender1 (wireless extenders 3) and Wi-Fi extender2 (e.g., wireless extender 3) include similar probe frames with parameters such as, but not limited to, SSIDs and the rates supported by client1, BSSID, capability information, power level information, association reports, non-association reports, channel usage, dwell times, reason codes, and other similar device and network parameters. The probe signal exchange between the client1 (e.g., client device 4) and Wi-Fi extender1 (wireless extenders 3) and Wi-Fi extender2 (e.g., wireless extender 3) enables the exchange of device and network parameters between the devices.

It is contemplated by the present disclosure that the exchange of probe signals between the client1 (e.g., client device 4) and Wi-Fi extender1 (wireless extenders 3) and Wi-Fi extender2 (e.g., wireless extender 3) in steps S6 and S7 can be performed at regular or periodic intervals as part of a network monitoring and management function for the one or more networks in the system of FIG. 1.

In steps S8-S10, client2 (e.g., client device 4) performs a similar probe signal exchange with the gateway device 2 and with the Wi-Fi extender1 (wireless extenders 3) and Wi-Fi extender2 (e.g., wireless extender 3) as client1 (e.g., client device 4). Additionally, the frame parameters in the probe signal exchange between client2 (e.g., client device 4) and the gateway device 2 and between client2 (e.g., client device 4) and Wi-Fi extender1 (wireless extenders 3) and Wi-Fi extender2 (e.g., wireless extender 3) would also be the same or similar to that previously discussed with respect to client1 in steps S5-S7 (e.g., client device 4).

For example, in step S8, the client2 (e.g., client device 4) transmits a probe request using its network interface 30 and wireless connection 9 to the gateway device 2. The gateway device 2 receives the probe request via its network interface 21 and wireless connection 9 and responds by transmitting a probe response back to the client2 (e.g., client device 4) using again its network interface 21 and wireless connection 9.

In steps S9 and S10, client2 (e.g., client device 4) also sends probe requests to Wi-Fi extender1 (e.g., wireless extender 3) and Wi-Fi extender2 (e.g., wireless extender 3) using network interface 30 and connection 9. Each of Wi-Fi extender1 (e.g., wireless extender 3) and Wi-Fi extender2 (e.g., wireless extender 3) receives the probe request using its network interface 48 and wireless connection 9 and obtains the probe request frame parameters. Each of Wi-Fi extender1 (e.g., wireless extender 3) and Wi-Fi extender2 (e.g., wireless extender 3) then transmits a probe response back to the client2 (e.g., client device 4).

The probe signal exchange between the client2 (e.g., client device 4) and gateway device 2, and between the client2 (e.g., client device 4) and Wi-Fi extender1 (wireless extenders 3) and Wi-Fi extender2 (e.g., wireless extender 3) enable the exchange of device and network parameters between the devices. Additionally, the exchange of probe signals between the client2 (e.g., client device 4) and the gateway device 2, and between client2 (e.g., client device 4) and Wi-Fi extender1 (wireless extenders 3) and Wi-Fi extender2 (e.g., wireless extender 3) can be at regular or periodic intervals as part of a network monitoring and management function for the one or more networks in the system of FIG. 1.

In steps S11 and S12, Wi-Fi extender1 (wireless extenders 3) and Wi-Fi extender2 (e.g., wireless extender 3) perform the exchange of probe signals with the gateway device 2. In step S11, Wi-Fi extender1 (wireless extenders 3) transmits a probe request using its network interface 48 and wireless connection 9 to the gateway device 2. The gateway device 2 receives the probe request via its network interface 21 and wireless connection 9 and responds by transmitting a probe response back to the Wi-Fi extender1 (wireless extenders 3) using again its network interface 21 and wireless connection 9.

The probe request from the Wi-Fi extender1 (e.g., wireless extender 3) includes a probe request frame with parameters such as, but not limited to, SSIDs and the rates supported by client1, BSSID, capability information, power level information, association reports, non-association reports, channel usage, dwell times, reason codes, and other similar device and network parameters. The probe request from the Wi-Fi extender1 (e.g., wireless extender 3) can also include any device and network parameters obtain from the exchange of probe signals with client1 (e.g., client device 4) and client2 (e.g., client device 4). Additionally, the probe response from the gateway device 2 can include similar frame parameters to that of the probe response transmitted to client1 and client2 in steps S5 and S8. The exchange of probe signals between the Wi-Fi extender1 (wireless extenders 3) and the gateway device 2 in step S11 enables the exchange of device and network parameters related to the Wi-Fi extender1 (e.g., wireless extender 3), client1 (e.g., client device 4) and client2 (e.g., client device 4).

In step S12, Wi-Fi extender2 (wireless extenders 3) transmits a probe request using its network interface 48 and wireless connection 9 to the gateway device 2. The gateway device 2 receives the probe request via its network interface 21 and wireless connection 9 and responds by transmitting a probe response back to the Wi-Fi extender2 (wireless extenders 3) using again its network interface 21 and wireless connection 9. The probe request from the Wi-Fi extender2 (e.g., wireless extender 3) may include the same or similar frame parameters to the probe request transmitted from Wi-Fi extender1 in step S11. Additionally, the probe response transmitted by the gateway device 2 may include the same or similar frame parameters to probe response transmitted by the gateway device 2 in step S11.

The probe request from the Wi-Fi extender2 (e.g., wireless extender 3) can also include any device and network parameters obtain from the exchange of probe signals with client1 (e.g., client device 4) and client2 (e.g., client device 4). Thus, the exchange of probe signals between Wi-Fi extender2 (wireless extenders 3) and the gateway device 2 in step S12 enables the exchange of device and network parameters related to Wi-Fi extender2 (e.g., wireless extender 3), client1 (e.g., client device 4) and client2 (e.g., client device 4). It is contemplated by the present disclosure that the exchange of probe signals between Wi-Fi extender1 (wireless extenders 3), Wi-Fi extender2 (e.g., wireless extender 3) and the gateway device 2 in steps 11 and 12 can be at regular or periodic intervals as part of a network monitoring and management function for the one or more networks in the system of FIG. 1.

In step S13, the gateway device 2 periodically monitors all the frame parameters (e.g., device and network parameters as indicated by the different devices in the system) including any or all frame parameters in the probe requests and frame parameters indicated by other message exchanges between the different devices (e.g., basic service set transmission management (BTM) requests and BTM responses), and also monitors the signal strengths of client1 (e.g., client device 4) and client2 (e.g., client device 4) with respect to Wi-Fi extender1. The controller 26 of the gateway device 2 can calculate the received signal strength indicator (RSSI), which indicates the signal strength of the signals (e.g., signal strength in decibels (dB)) of client1 (e.g., client device 4) and client2 (e.g., client device 4) on the Wi-Fi extender1 (e.g., wireless extender 3). However, because RSSI values can fluctuate, it is contemplated by the present disclosure that an average RSSI value can be used for determining the signal strength. Additionally, other criteria can be implemented such as determining the median or normal distribution of the RSSI values.

In step S14, the gateway device 2 periodically monitors all the frame parameters (e.g., device and network parameters as indicated by the different devices in the system) including any or all frame parameters in the probe requests and frame parameters indicated by other message exchanges between the different devices (e.g., BTM requests and BTM responses), and also monitors the signal strengths of client1 (e.g., client device 4) and client2 (e.g., client device 4) with respect to Wi-Fi extender2. The controller 26 of the gateway device 2 can calculate the RSSI, which indicates the signal strength of the signals (e.g., signal strength in decibels (dB)) of client1 (e.g., client device 4) and client2 (e.g., client device 4) on the Wi-Fi extender2 (e.g., wireless extender 3). By periodically monitoring all the frame parameters (e.g., device and network parameters as indicated by the different devices in the system) received and the signal strengths of client1 (e.g., client device 4) and client2 (e.g., client device 4) on both Wi-Fi extender1 (e.g., wireless extender 3) and Wi-Fi extender2 (e.g., wireless extender 3), the gateway device 2 can identify potential connection issues with respect to Wi-Fi extender1 and Wi-Fi extender2.

For example, the controller 26 executes one or more programs 25 stored in the memory 24 of the gateway device 2 for monitoring specific conditions with respect to the frame parameters (e.g., device and network parameters as indicated by the different devices in the system) received and the signal strengths of client1 (e.g., client device 4) and client2 (e.g., client device 4) for identifying potential connection issues. The details of the different conditions monitored with respect to the frame parameters (e.g., device and network parameters as indicated by the different devices in the system) received and the signal strengths of client1 (e.g., client device 4) and client2 (e.g., client device 4) for identifying the connection issues will be discussed in detail with reference to FIG. 4.

The controller 26 of the gateway device 2 will transmit an alert or issue report to one or more client devices 4 or mobile devices 5 in the system using its network interface 21 and wireless connection 9, 10, regarding any connection issues identified on a particular wireless extender 3 (e.g., Wi-Fi extender1 or Wi-Fi extender2). As shown in the exemplary method and algorithm of FIG. 3, the gateway device 2 has determined, based on monitoring specific conditions with respect to the frame parameters (e.g., device and network parameters as indicated by the different devices in the system) received and the signal strengths of client1 (e.g., client device 4) and client2 (e.g., client device 4), that there are connection issues with Wi-Fi extender2 (e.g., wireless extender 3) and its connection to client2 (e.g., client device 4).

Accordingly, in step S15, the gateway device 2 transmits an alert or issue report regarding the connection issues to client2 (e.g., client device 4). In step S16, client2, based on the alert or issue report, is prompted to take actions to re-install Wi-Fi extender2 into the one or more networks of the system for re-establishing a connection and correcting the connection issues. The alert or issue report can be shared with a multiple-system operator (MSO) portal for assistance with re-installation steps for Wi-Fi extender2 or the alert or issue report could include installation instructions for Wi-Fi extender2.

Figure 4:
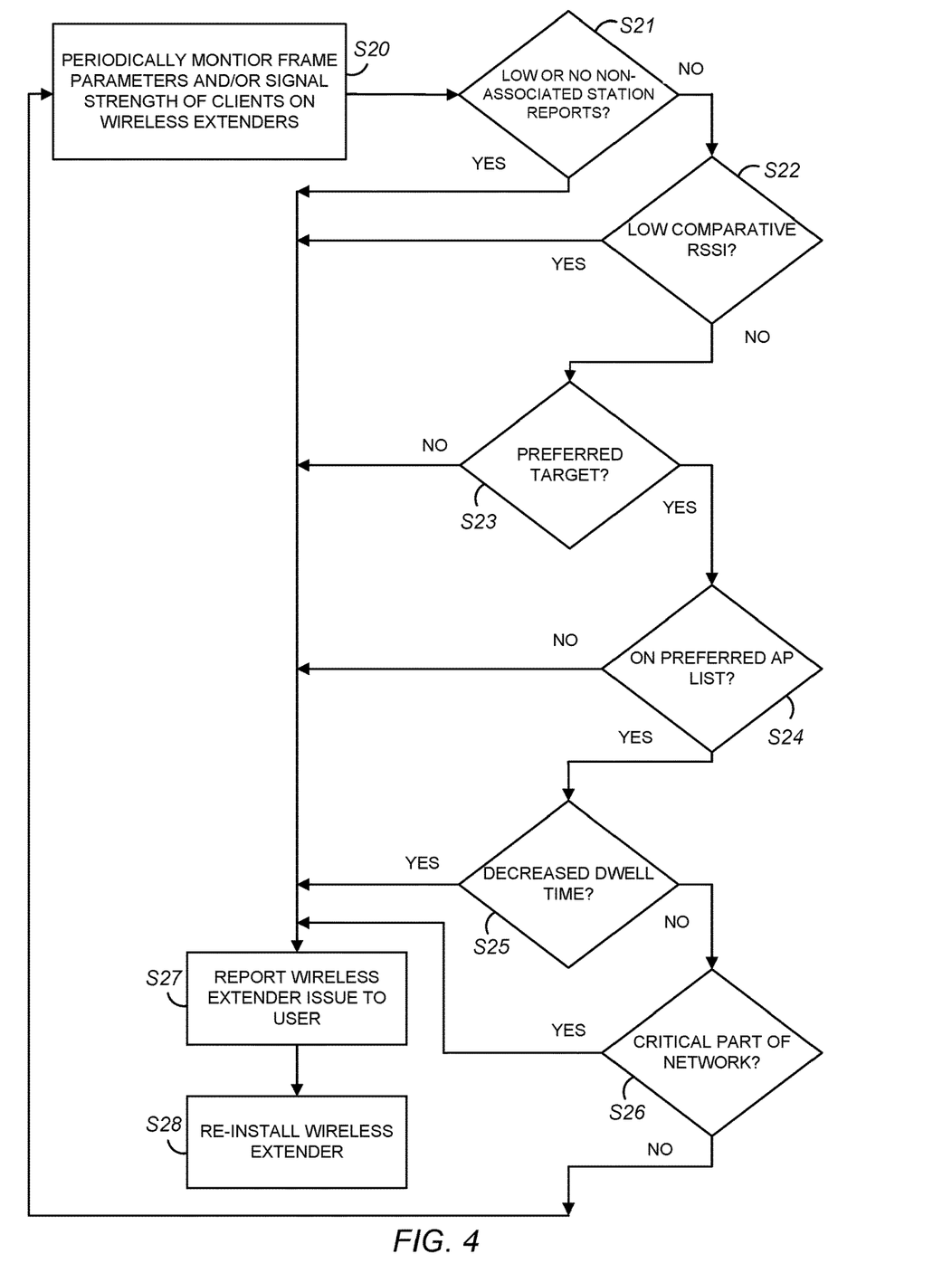
FIG. 4 illustrates a method and algorithm for performing for performing monitoring and installation enhancements according to an embodiment of the present disclosure.

FIG. 4 illustrates a method and algorithm for performing monitoring and installation enhancements according to an embodiment of the present disclosure. The exemplary method and algorithm of FIG. 4 illustrates the different conditions monitored by the gateway device 2 using the frame parameters (e.g., device and network parameters as indicated by the different devices in the system) received and/or the signal strengths of the client devices on the wireless extenders 3 for identifying connection issues with one or more wireless extenders 3 in the system of FIG. 1.

In step S20, the gateway device 2 periodically monitors frame parameters (e.g., device and network parameters as indicated by the different devices in the system) including any or all frame parameters in the probe requests and any or all frame parameters indicated by other message exchanges between the different devices (e.g., BTM requests and BTM responses), and also monitors the signal strengths of the client devices 4 on the wireless extenders 3. The controller 26 executes one or more programs 25 stored in the memory 24 of the gateway device 2 for monitoring specific conditions with respect to the frame parameters (e.g., device and network parameters as indicated by the different devices in the system) received and the signal strengths.

For example, as a first monitored condition in step S21, the controller 26 of gateway device 2 monitors if any wireless extender 3 shows a reduced number or no non-associated station reports (e.g., non-association reports) as indicated by the frame parameters received. A wireless extender 3 may show a reduced number of non-associated station reports over a certain period of time or show no non-associated station reports over a certain period of time. In such a situation, other wireless extenders in the network may experience an increased number of non-associated station reports than what would or should normally occur when all the extenders are functioning properly.

As used herein, the phrase "reduced number of non-associated station reports" means that the number of non-associated station reports (e.g., non-association reports) is determined to be lower than some number, such as a preset number, or historical average over time for a wireless extender or for the particular wireless extender in question. A reduced number of non-associated station reports or no non-associated station reports can be an indication of a wireless extender 3 having trouble hearing (e.g., receiving signals) other devices (e.g., client device 4 or other wireless extenders 3) due to its positioning or an indication of other configuration or performance issues related to a wireless extender 3. Additionally, a reduced number of non-associated station reports or no non-associated station reports can be an indication that the wireless extender 3 is not an ideal candidate for the MAP steering logic implemented in the system.

In step S21, if there is an indication of a reduced number of non-associated station reports over a certain period of time or no non-associated station reports over a certain period of time by a wireless extender 3, then the controller 26 of the gateway device 2 transmits an alert or issue report to a user (e.g., client device 4 or mobile device 5) regarding a connection issue with the wireless extender 3 in step S27. In step S28, based on the alert or issue report, the user (e.g., client device 4 or mobile device 5) is prompted to take actions to re-install the wireless extender 3 identified as having a connection issue. The alert or issue report can be shared with an MSO portal for assistance with re-installation steps or the alert or issue report can include installation instructions for the wireless extender 3 having a connection issue.

On the other hand, in step S21, if the controller 26 of the gateway device 2 determines that there is no indication of a reduced number of non-associated station reports over a certain period of time or no non-associated station reports over a certain period of time from any particular wireless extender 3, then the controller 26 of the gateway device 2 will continue to monitor for a second condition in step S22. In step S22, the controller 26 of the gateway device 2 monitors if any wireless extender shows comparatively low non-associated RSSI compared to, for example, a historical average of non-associated RSSI. In step S22, if it is determined by the controller 26 of the gateway device 2 that a wireless extender 3 shows comparatively low non-associated RSSI compared to a historical average of non-associated RSSI, then the controller 26 of the gateway device 2 transmits an alert or issue report to a user (e.g., client device 4 or mobile device 5) regarding a connection issue the wireless extender 3 in step S27. In step S28, based on the alert or issue report, the user (e.g., client device 4 or mobile device 5) is prompted to take actions to re-install the wireless extender 3 identified as having the connection issue. The alert or issue report can be shared with an MSO portal for assistance with re-installation steps or the alert or issue report can include installation instructions for the wireless extender 3 having a connection issue.

In step S22, if it is determined by the controller 26 of the gateway device 2 that there is no indication of any wireless extender 3 showing comparatively low non-associated RSSI compared to a historical average non-associated RSSI, then the controller 26 of the gateway device 2 will continue to monitor for a third condition in step S23. In step S23, the controller 26 of the gateway device 2 monitors if any wireless extender 3 is not currently or is not becoming a preferred target of the MAP steering logic implemented in the system. In step S23, if it is determined by the controller 26 of the gateway device 2 that a wireless extender 3 is not currently or is not becoming a preferred target of the MAP steering logic, then the controller 26 of the gateway device 2 transmits an alert or issue report to a user (e.g., client device 4 or mobile device 5) regarding a connection issue with the wireless extender 3 in step S27. In step S28, based on the alert or issue report, the user (e.g., client device 4 or mobile device 5) is prompted to take actions to re-install the wireless extender 3 identified as having the connection issue. The alert or issue report can be shared with an MSO portal for assistance with re-installation steps or the alert or issue report can include installation instructions for the wireless extender 3 having a connection issue.

However, in step S23, if the controller 26 of the gateway device 2 determines that there is no indication that any wireless extender 3 is not currently or not becoming a preferred target of the MAP steering logic, then the controller 26 of the gateway device 2 will continue to monitor for a fourth condition in step S24. In step S24, the controller 26 of gateway device 2 monitors if any wireless extender 3 is not on the preferred list of devices (e.g., preferred AP list) of the client devices 4, as indicated, for example, in BTM responses of the client devices 4. In step S24, if it is determined by the controller 26 of the gateway device 2 that a wireless extender 3 is not on the preferred list of devices (e.g., preferred AP list) of the client devices 4, then the controller 26 of the gateway device 2 transmits an alert or issue report to a user (e.g., client device 4 or mobile device 5) regarding a connection issue with the wireless extender 3 in step S27.

In step S28, based on the alert or issue report, the user (e.g., client device 4 or mobile device 5) is prompted to take actions to re-install the wireless extender 3 identified as having the connection issue. The alert or issue report can be shared with an MSO portal for assistance with re-installation steps or the alert or issue report can include installation instructions for the wireless extender 3 having a connection issue.

In step S24, if the controller 26 of the gateway device 2 determines that there is no indication of a wireless extenders 3 not being on the preferred list of devices (e.g., preferred AP list) of the client devices 4, then the controller 26 of the gateway device 2 will continue to monitor for a fifth condition in step S25. In step S25, the controller 26 of gateway device 2 monitors if any wireless extender 3 indicates a decreased dwell time by one or more client devices 4. The decreased dwell times by one or more client devices 4 on a wireless extender 3 can be due to issues related to low RSSI and channel utilization as indicated by the frame parameters of the probe requests and signal strength of the client devices 4 on the wireless extender 3.

In step S25, if it is determined by the controller 26 of the gateway device 2 that a wireless extender 3 indicates a decreased dwell time by one or more client devices 4, then the controller 26 of the gateway device 2 transmits an alert or issue report to a user (e.g., client device 4 or mobile device 5) regarding a connection issue with the wireless extender 3 in step S27. In step S28, based on the alert or issue report, the user (e.g., client device 4 or mobile device 5) is prompted to take actions to re-install the wireless extender 3 identified as having the connection issue. The alert or issue report can be shared with an MSO portal for assistance with re-installation steps or the alert or issue report can include installation instructions for the wireless extender 3 having a connection issue.

In step S25, if the controller 26 of the gateway device 2 determines that there is no indication of any wireless extender 3 having decreased dwell times by one or more client devices 4, then the controller 26 of the gateway device 2 will continue to monitor for a sixth condition in step S26. In step S26, the controller 26 of gateway device 2 monitors if any wireless extender 3 is becoming a critical part of one or more networks in the system. That is, based on association information in the frame parameters of the probe requests, there can be an indication that a wireless extender 3 is typically backhauling or daisy chaining on another wireless extender 3 or a wireless extender 3 appears to host more client devices 4 than other wireless extenders 2. That is, one wireless extender 3 may show an increase in the number of hosted client devices 4 during a certain period of time while another wireless extender 3 may show a decrease in the number of hosted client devices 4 during the same period of time, which can be an indication of a connection or performance issue with a wireless extender 3 (e.g., a wireless extender 3 backhauling or daisy chaining, or showing a reduced number of hosted client devices 4 may be experiencing a connection or performance issue).

In step S26, if it is determined by the controller 26 of the gateway device 2 that a wireless extender 3 is becoming a critical part of one or more networks in the system, then the controller 26 of the gateway device 2 transmits an alert or issue report to a user (e.g., client device 4 or mobile device 5) regarding a connection issue with a wireless extender 3 in step S27. In step S28, based on the alert or issue report, the user (e.g., client device 4 or mobile device 5) is prompted to take actions to re-install the wireless extender 3 identified as having the connection issue. In step S26, if the controller 26 of the gateway device 2 determines that there is no indication that any wireless extender 3 becoming a critical part of one or more networks in the system, then the controller 26 of the gateway device 2 will continue to periodically monitor all the frame parameters (e.g., device and network parameters as indicated by the different devices in the system) received from the probe requests and the signal strengths of the client devices 4, as in step S20.

By periodically monitoring all the frame parameters (e.g., device and network parameters as indicated by the different devices in the system) including any or all frame parameters in the probe requests and any or all frame parameters indicated by other message exchanges between the different devices (e.g., BTM requests and BTM responses), and by monitoring the signal strengths of the client devices 4 on the wireless extenders 3, the gateway device 2 can identify potential connection issues with respect to any one or any combination of wireless extenders 3 in the one or more of the networks in the system and prompt a user to take corrective action with respect to any one or any combination of wireless extenders 3.

Although FIG. 4 indicates that the conditions and alerts or reports are sequentially monitored and reported, it is contemplated by the present disclosure that the controller 26 of the gateway device 2 may identify one or any combination of the conditions identified in FIG. 4 and issue alerts or reports containing one or any combination of connection issues with respect to any one or any combination of wireless extenders 3 in the system.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 3 and 4. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. A gateway device for monitoring and detecting a connection issue in a wireless network, the wireless network configured to communicatively interconnect the gateway device, one or more wireless extenders, and one or more client devices, the gateway device comprising:
   a network controller,
   a non-transitory memory storing a program; and
   a communication interface configured to establish communication connections with the one or more client devices and the one or more wireless extenders via the wireless network,
   wherein the network controller is configured to execute the program to:
   receive, using the communication interface, probe requests from the one or more client devices and the one or more wireless extenders;
   periodically monitor, using the network controller, at least one of: i) frame parameters, or ii) signal strength information based on the probe requests received from the one or more client devices and the one or more wireless extenders;
   identify, using the network controller, a connection issue with respect to at least one wireless extender among the one or more wireless extenders based on the periodically monitored at least one of: i) frame parameters, or ii) signal strength information; and
   transmit, using the communication interface, a report or alert regarding the connection issue to at least one client device among the one or more client devices,
   wherein the report or alert is used to prompt a re-installation of the at least one of the wireless extenders having the connection issue.

2. The gateway device of claim 1, wherein the network controller periodically monitors non-associated station reports with respect to the one or more client devices, and
   the report or alert indicates that the at least one wireless extender having the connection issue includes a reduced number or no non-associated station reports with respect to the one or more client devices.

3. The gateway device of claim 1, wherein the network controller periodically monitors non-associated received signal strength indicator (RSSI) information, and
   the report or alert indicates that the at least one wireless extender having the connection issue includes a low non-associated RSSI compared to historical averages of non-associated RSSI.

4. The gateway device according to claim 1, wherein the network controller periodically monitors a preferred access point (AP) list of the one or more client devices, and
   the report or alert indicates that the at least one wireless extender having the connection issue is not included on the preferred AP list.

5. The gateway device according to claim 1, wherein the network controller periodically monitors multi-access point (MAP) steering logic, and
   the report or alert indicates that the at least one wireless extender having the connection issue is not a preferred target device of the MAP steering logic.

6. The gateway device according to claim 1, wherein the network controller periodically monitors client device dwell times, and
   the report or alert indicates decreased dwell times by the one or more client device on the at least one wireless extender having the connection issue during a predetermined timed period.

7. The gateway device according to claim 1, wherein the network controller periodically monitors association information indicating when any wireless extender is utilized as a backhaul device for another wireless extender or a number of client devices associated with each wireless extender, and
the report or alert indicates that the at least one wireless extender having the connection issue utilizes another wireless extender as a backhaul device or includes a reduced number of associated client device while another wireless extender includes an increased number of associated client devices.

8. The gateway device according to claim 1, wherein the probe request received at the one or more wireless extenders from the one or more client devices and the probe requests received at the gateway device from the one or more client devices and the one or more wireless extenders are received periodically in response to beacon signals transmitted by the gateway device at a predetermined interval, and
probe responses are transmitted from the one or more wireless extenders and gateway device in response to the received probe requests.

9. The gateway device according to claim 1, wherein network controller is a multi-access point controller or a mesh network controller.

10. A system for monitoring and detecting a connection issue in a wireless network comprising:
a gateway device including,
a hardware processor,
a non-transitory memory storing a program; and
a network interface configured to establish communication connections via the wireless network;
one or more client devices, each client device including,
a hardware processor,
a non-transitory memory storing a program; and
a network interface configured to establish communication connections via the wireless network; and
one or more wireless extenders, each wireless extender including,
a hardware processor,
a non-transitory memory storing a program; and
a network interface configured to establish communication connections via the wireless network,
wherein each of gateway device, the one or more client devices, and the one or more wireless extenders execute their respective programs using their respective hardware processors to:
receive, using each communication interface of one or more wireless extenders, probe requests from the one or more client devices;
receive, using the communication interface of the gateway device, probe requests from the one or more client devices and the one or more wireless extenders;
periodically monitor, using the network controller of the gateway device, at least one of: i) frame parameters, or ii) signal strength information based on the probe requests received from the one or more client devices and the one or more wireless extenders;
identify, using the network controller, a connection issue with respect to at least one wireless extender among the one or more wireless extenders based on the periodically monitored at least of: i) frame parameters, or ii) signal strength information; and
transmit, using the communication interface of the gateway device, a report or alert regarding the connection issue to at least one client device among the one or more client devices,
wherein the report or alert is used to prompt a re-installation of the at least one of the wireless extenders having the connection issue.

11. The system of claim 10, wherein the transmitted report or alert indicates any one or any combination of the following conditions: 1) the at least one wireless extender having the connection issue includes a reduced number or no non-associated station reports with respect to the one or more client devices; 2) the at least one wireless extender having the connection issue includes a low non-associated received signal strength indicator (RSSI) compared to historical averages of non-associated RSSI; 3) the at least one wireless extender having the connection issue is not included on a preferred access point (AP) list of the one or more client devices; 4) the at least one wireless extender having the connection issue is not a preferred target device of the multi-access point (MAP) steering logic; 5) decreased dwell times by the one or more client device on the at least one wireless extender having the connection issue during a predetermined timed period; or 6) the at least one wireless extender having the connection issue utilizes another wireless extender as a backhaul device or includes a reduced number of associated client device while another wireless extender includes an increased number of associated client devices.

12. The system of claim 10, wherein the wireless network is a multi-access point or mesh network and the hardware processor of the gateway device is a multi-access point controller or a mesh network controller.

13. A method for monitoring and detecting a connection issue in a wireless network, the wireless network configured to communicatively interconnect a gateway device having a network controller, one or more wireless extenders, and one or more client devices, the method comprising:
receiving, at the one or more wireless extenders, probe requests from the one or more client devices;
receiving, at the gateway device, probe requests from the one or more client devices and the one or more wireless extenders;
periodically monitoring, using the network controller, at least one of: i) frame parameters, or ii) signal strength information based on the probe requests received from the one or more client devices and the one or more wireless extenders;
identifying, using the network controller, a connection issue with respect to at least one wireless extender among the one or more wireless extenders based on the periodically monitored at least one of: i) frame parameters, or ii) signal strength information; and
transmitting, from the gateway device, a report or alert regarding the connection issue to at least one client device among the one or more client devices,
wherein the report or alert is used for prompting a re-installation of the at least one of the wireless extenders having the connection issue.

14. The method of claim 13, wherein the periodically monitoring of at least one of: i) frame parameters, or ii) signal strength information includes monitoring of non-associated station reports with respect to the one or more client devices, and
the transmitted report or alert indicates that the at least one wireless extender having the connection issue includes a reduced number or no non-associated station reports with respect to the one or more client devices.

15. The method of claim 13, wherein the periodically monitoring of at least one of: i) frame parameters, or ii)

signal strength information includes monitoring non-associated received signal strength indicator (RSSI) information, and the transmitted report or alert indicates that the at least one wireless extender having the connection issue includes a low non-associated RSSI compared to historical averages of non-associated RSSI.

16. The method according to claim 13, wherein the periodically monitoring of at least one of: i) frame parameters, or ii) signal strength information includes monitoring a preferred access point (AP) list of the one or more client devices, and the transmitted report or alert indicates that the at least one wireless extender having the connection issue is not included on the preferred AP list.

17. The method according to claim 13, wherein the periodically monitoring of at least one of: i) frame parameters, or ii) signal strength information includes monitoring multi-access point (MAP) steering logic, and the transmitted report or alert indicates that the at least one wireless extender having the connection issue is not a preferred target device of the MAP steering logic.

18. The method according to claim 13, wherein the periodically monitoring of at least one of: i) frame parameters, or ii) signal strength information includes monitoring of client device dwell times, and the transmitted report or alert indicates decreased dwell times by the one or more client device on the at least one wireless extender having the connection issue during a predetermined timed period.

19. The method according to claim 13, wherein the periodically monitoring of at least one of: i) frame parameters, or ii) signal strength information includes monitoring association information indicating when any wireless extender is utilized as a backhaul device for another wireless extender or a number of client devices associated with each wireless extender, and the transmitted report or alert indicates that the at least one wireless extender having the connection issue utilizes another wireless extender as a backhaul device or includes a reduced number of associated client device while another wireless extender includes an increased number of associated client devices.

20. A non-transitory computer-readable recording medium in a gateway device for monitoring and detecting a connection issue in a wireless network, the wireless network configured to communicatively interconnect a gateway device having a network controller, one or more wireless extenders, and one or more client devices, the non-transitory computer-readable recording medium storing one or more programs which when executed by a hardware processor performs steps comprising:

receiving, at the gateway device, probe requests from the one or more client devices and the one or more wireless extenders;

periodically monitoring, using the network controller, at least one of: i) frame parameters, or ii) signal strength information based on the probe requests received from the one or more client devices and the one or more wireless extenders;

identifying, using the network controller, a connection issue with respect to at least one wireless extender among the one or more wireless extenders based on the periodically monitored at least one of: i) frame parameters, or ii) signal strength information; and transmitting, from the gateway device, a report or alert regarding the connection issue to at least one client device among the one or more client devices, wherein the report or alert is used for prompting a re-installation of the at least one of the wireless extenders having the connection issue.

21. The non-transitory computer-readable recording medium according to claim 20, wherein the transmitted report or alert indicates any one or any combination of the following conditions: 1) the at least one wireless extender having the connection issue includes a reduced number or no non-associated station reports with respect to the one or more client devices; 2) the at least one wireless extender having the connection issue includes a low non-associated received signal strength indicator (RSSI) compared to historical averages of non-associated RSSI; 3) the at least one wireless extender having the connection issue is not included on a preferred access point (AP) list of the one or more client devices; 4) the at least one wireless extender having the connection issue is not a preferred target device of the multi-access point (MAP) steering logic; 5) decreased dwell times by the one or more client device on the at least one wireless extender having the connection issue during a predetermined timed period; or 6) the at least one wireless extender having the connection issue utilizes another wireless extender as a backhaul device or includes a reduced number of associated client device while another wireless extender includes an increased number of associated client devices.

\* \* \* \* \*